US008545707B2

(12) United States Patent
Rego et al.

(10) Patent No.: US 8,545,707 B2
(45) Date of Patent: Oct. 1, 2013

(54) REDUCED PRESSURE DROP COALESCER

(75) Inventors: Eric J. Rego, Verona, WI (US); Brian W. Schwandt, Fort Atkinson, WI (US); Eric A. Janikowski, Jefferson, WI (US); Barry M. Verdegan, Stoughton, WI (US); Kwok-Lam Ng, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 385 days.

(21) Appl. No.: 12/982,259

(22) Filed: Dec. 30, 2010

(65) Prior Publication Data

US 2011/0094382 A1 Apr. 28, 2011

Related U.S. Application Data

(63) Continuation of application No. 11/230,694, filed on Sep. 20, 2005.

(51) Int. Cl.
*B01D 17/022* (2006.01)
*B01D 24/30* (2006.01)

(52) U.S. Cl.
USPC ........... 210/800; 210/634; 210/738; 210/780; 210/DIG. 5

(58) Field of Classification Search
None
See application file for complete search history.

(56) References Cited

U.S. PATENT DOCUMENTS 3,645,398 A 2/1972 Flocco
3,755,527 A 8/1973 Keller
3,801,400 A 4/1974 Bogt et al.
3,841,953 A 10/1974 Lohkamp at al.
3,870,640 A 3/1975 Reece
3,904,798 A 9/1975 Vogt et al.
3,933,557 A 1/1976 Pall
3,938,973 A 2/1976 Kershaw
3,949,130 A 4/1976 Sabee et al.
3,971,373 A 7/1976 Braun
3,972,759 A 8/1976 Buntin
3,978,185 A 8/1976 Buntin et al.
4,048,364 A 9/1977 Harding et al.
4,078,124 A 3/1978 Prentice
4,116,738 A 9/1978 Pall
4,192,919 A 3/1980 Raghavachari
4,249,918 A * 2/1981 Argo et al. ...................... 95/273

(Continued)

FOREIGN PATENT DOCUMENTS

EP 0325854 4/1993
EP 0428400 6/1995

(Continued)

OTHER PUBLICATIONS

Jaroszczyk et al., "Chapter 10 Cartridge Filtration", Filtration Principles and Practices, Second Edition, Revised and Expanded, Michael Matteson and Clyde Orr, eds., Marcel Dekker, Inc., New York, 1987, p. 547.

(Continued)

*Primary Examiner* — Katherine Zalasky

(74) *Attorney, Agent, or Firm* — Andrus, Sceales, Starke & Sawall, LLP

(57) ABSTRACT

A coalescer includes fibrous media capturing droplets of the dispersed phase, coalescingly growing the droplets into larger drops which further coalesce and grow to form pools that drain, and adapted to reduce pressure drop thereacross by increasing dispersed phase drainage therefrom.

10 Claims, 6 Drawing Sheets

40
42
46
48
48
44
50
52

(56) References Cited

U.S. PATENT DOCUMENTS 4,253,954 A 3/1981 Midkiff et al.
4,282,097 A 8/1981 Kuepper et al.
4,416,782 A 11/1983 Kerres
4,524,000 A 6/1985 Clayfield et al.
4,594,202 A 6/1986 Pall et al.
4,668,393 A 5/1987 Stone
4,689,058 A 8/1987 Vogt et al.
4,726,901 A 2/1988 Pall et al.
4,859,348 A 8/1989 Jusaitis et al.
4,874,339 A 10/1989 Bratz
4,878,929 A 11/1989 Tofsland et al.
4,892,667 A 1/1990 Parker, III et al.
4,995,974 A 2/1991 Lorey et al.
5,061,170 A 10/1991 Allen et al.
5,075,068 A 12/1991 Milligan et al.
5,122,048 A 6/1992 Deeds
5,129,923 A * 7/1992 Hunter et al. .................. 95/273
5,145,689 A 9/1992 Allen et al.
5,174,907 A 12/1992 Chown et al.
5,227,172 A 7/1993 Deeds
5,236,641 A 8/1993 Allen et al.
5,254,297 A 10/1993 Deeds
5,269,670 A 12/1993 Allen et al.
5,273,565 A 12/1993 Milligan
5,296,061 A 3/1994 Ando et al.
5,306,321 A 4/1994 Osendorf
5,340,479 A 8/1994 Szczepanski et al.
5,401,458 A 3/1995 Wadsworth et al.
5,409,642 A 4/1995 Allen et al.
5,411,576 A 5/1995 Jones et al.
5,419,953 A 5/1995 Chapman
5,427,597 A 6/1995 Osendorf
5,454,848 A 10/1995 Miller
5,470,663 A 11/1995 Wadsworth et al.
5,472,481 A 12/1995 Jones et al.
5,480,547 A 1/1996 Williamson et al.
5,501,872 A 3/1996 Allen et al.
5,591,335 A 1/1997 Barboza et al.
5,605,706 A 2/1997 Allen et al.
5,618,566 A 4/1997 Allen et al.
5,667,562 A 9/1997 Midkiff
5,672,232 A 9/1997 Clack
5,681,469 A 10/1997 Barboza et al.
5,733,581 A 3/1998 Barboza et al.
5,750,024 A 5/1998 Spearman
5,800,706 A 9/1998 Fischer
5,913,851 A 6/1999 Gryskiewicz et al.
5,916,678 A 6/1999 Jackson et al.
5,972,063 A 10/1999 Dudrey et al.
5,994,482 A 11/1999 Georgellis et al.
6,019,809 A 2/2000 Kahibaugh et al.
6,093,231 A 7/2000 Read et al.
6,114,017 A 9/2000 Fabbricante et al.
6,117,322 A 9/2000 Miller et al.
6,123,061 A 9/2000 Baker et al.
6,136,076 A 10/2000 Read
6,146,580 A 11/2000 Bontaites
6,171,369 B1 1/2001 Schultink et al.
6,179,890 B1 1/2001 Ramos et al.
6,314,344 B1 11/2001 Sauer et al.
6,315,805 B1 11/2001 Strauss
6,342,283 B1 1/2002 Mozelack et al.
6,358,417 B1 3/2002 Aune et al.
6,387,141 B1 5/2002 Hollingsworth et al.
6,387,144 B1 5/2002 Jaroszczyk et al.
6,402,951 B1 6/2002 Wilson et al.
6,422,396 B1 7/2002 Li et al.
6,423,227 B1 7/2002 Allen et al.
6,432,175 B1 8/2002 Jones et al.
6,485,535 B1 11/2002 Linnersten et al.
6,488,801 B1 12/2002 Bodaghi et al.
6,521,555 B1 2/2003 Bodaghi et al.
6,544,310 B2 4/2003 Badeau et al.
6,585,790 B2 7/2003 Linnersten et al.
6,613,268 B2 9/2003 Haynes et al.
6,662,842 B2 12/2003 Mozelack et al.
6,736,274 B2 5/2004 Tremblay et al.
6,797,025 B2 9/2004 Linnersten et al.
6,811,588 B2 11/2004 Niakin
6,838,402 B2 1/2005 Harris et al.
6,860,917 B2 3/2005 Henrichsen et al.
6,872,431 B2 3/2005 Kahlbaugh et al.
6,916,353 B2 7/2005 Tang
6,916,395 B2 7/2005 Aune et al.
6,932,923 B2 8/2005 Nguyen
6,938,781 B2 9/2005 Aune et al.
6,989,193 B2 1/2006 Haile et al.
7,128,835 B1 10/2006 Hundley et al.
7,309,372 B2 12/2007 Kahlbaugh et al.
2002/0046656 A1 4/2002 Benson et al.
2002/0070471 A1 6/2002 Lee
2002/0073667 A1 6/2002 Barris et al.
2002/0092423 A1 7/2002 Gillingham et al.
2002/0187701 A1 12/2002 Healey
2003/0010002 A1 1/2003 Johnson et al.
2003/0080464 A1 5/2003 Aune et al.
2003/0116874 A1 6/2003 Haynes
2003/0203696 A1 10/2003 Healey
2005/0082238 A1 4/2005 Larson
2006/0278574 A1 12/2006 Khan et al.
2007/0039300 A1 2/2007 Kahlbaugh et al.

FOREIGN PATENT DOCUMENTS

EP 0682557 4/1997
EP 0616831 6/1999
EP 0960645 2/2000
EP 1270771 1/2003
EP 1198280 6/2003
EP 1173269 7/2003
EP 1050331 12/2003
EP 1133342 1/2004
EP 01048335 4/2005
GB 02015253 9/1979
GB 02194255 3/1988
GB 02195558 4/1988
JP 11036169 2/1999
PL 172113 4/1995
PL 186112 9/1999
WO 9513856 5/1995
WO 9739817 10/1997
WO 0029656 5/2000
WO 0142549 6/2001
WO 0220133 3/2002
WO 0220668 3/2002
WO 2004110592 12/2004

OTHER PUBLICATIONS

Moses et al., "A Visual Study of the Breakdown of Emulsions in Porous Coalescers", Chemical Engineering Science, 40(12): 2339-2350, 1985.

Spielman et al., "Coalescence in Oil-in-Water Suspensions by Flow Through Porous Media", Ind. Eng. Chem. Fundamentals, 16:272-282, 1977.

Spielman at al., "Experiments in Coalescence by Flow through Fibrous Mats", Ind. Eng. Chem. Fundamentals, 11:73-83, 1972b.

Spielman at al., "Progress in Induced Coalescence and a New Theoretical Framework for Coalescence by Porous Media", Flow through Porous Media, R. Nunge, Chairman, ACS Publications, Washington, D.C., 1970.

Spielman at al., "Theory of Coalescence by Flow through Porous Media", Ind. Eng. Chem. Fundamentals, 11:66-72, 1972a.

* cited by examiner

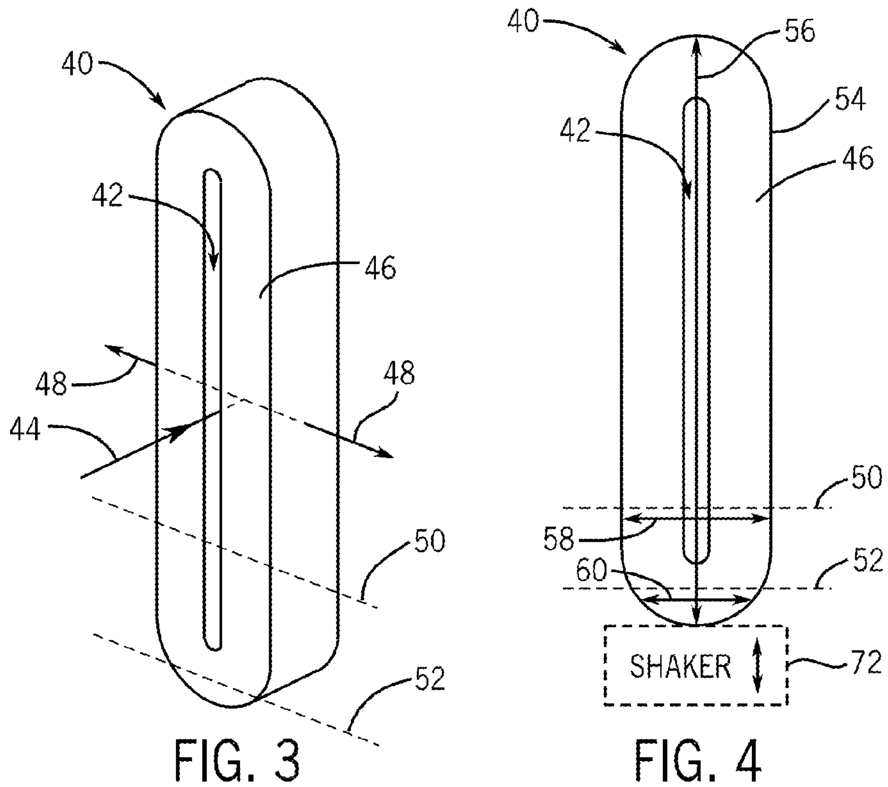
FIG. 3
FIG. 4
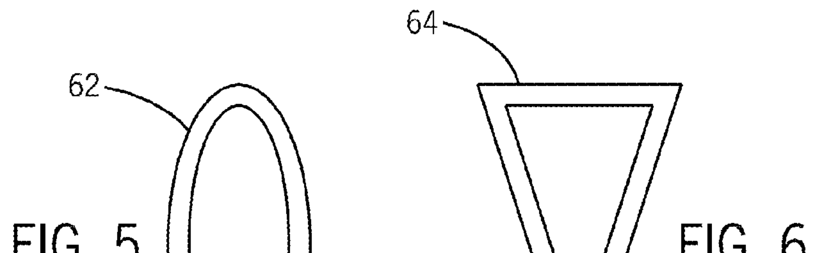
FIG. 5
FIG. 6
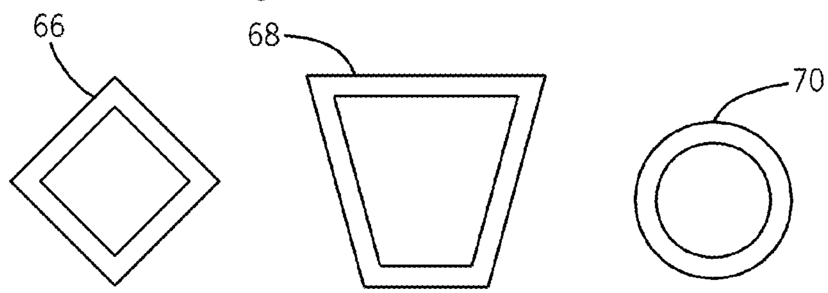
FIG. 7
FIG. 8
FIG. 9

REDUCED PRESSURE DROP COALESCER

CROSS REFERENCE TO RELATED APPLICATIONS

This application is a continuation of U.S. patent application Ser. No. 11/230,694, filed Sep. 20, 2005, the content of which is incorporated by reference herein in its entirety.

BACKGROUND AND SUMMARY

The invention related to fibrous media coalescers.

Fibrous media coalescers are known in the prior art for coalescing and separating a medium having two immiscible phases, namely a continuous phase and a dispersed phase. For example: in engine crankcase ventilation systems, and other air-oil separation systems, the continuous phase is air, and the dispersed phase is oil; in fuel-water separation systems, such as fuel filters, fuel is the continuous phase, and water is the dispersed phase; in water-oil separation systems, water is the continuous phase, and oil is the dispersed phase. The invention is particularly well suited for engine crankcase ventilation applications, but may be used in other separation systems having immiscible fluids, e.g. air-oil, fuel-water, water-oil, etc.

In designing a coalescer, trade-offs often need to be made. For example, to increase efficiency by decreasing fiber diameter and/or decreasing porosity and/or increasing thickness, the trade-off may be higher pressure drop and/or shorter life and/or larger package size. The present invention provides desirable options for more favorable trade-offs, including lower pressure drop.

BRIEF DESCRIPTION OF THE DRAWING

FIG. 3 is a perspective view of a coalescer in accordance with the invention.

FIG. 4 is a front elevation view of the coalescer of FIG. 3, and shows a further embodiment.

FIG. 5 is like FIG. 4 and shows another embodiment.

FIG. 6 is like FIG. 4 and shows another embodiment.

FIG. 7 is like FIG. 4 and shows another embodiment.

FIG. 8 is like FIG. 4 and shows another embodiment.

FIG. 9 is like FIG. 4 and shows another embodiment.

DETAILED DESCRIPTION

Figure 1:
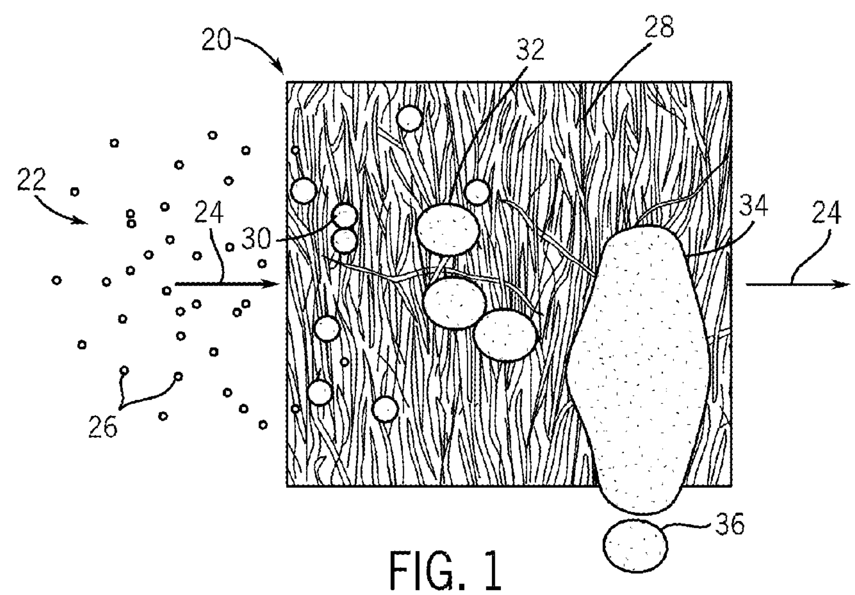
FIG. 1 schematically illustrates coalescence.

FIG. 1 shows a coalescer 20 for coalescing a medium 22 having two immiscible phases, namely a continuous phase 24 and a dispersed phase 26. For example, in the case of an engine crankcase ventilation coalescer, the continuous phase 24 is air, and the dispersed phase is oil, e.g. in the form of a fine mist having droplets 26 of about one micron and smaller in diameter. The continuous phase 24 flows from upstream to downstream, i.e. left to right in FIG. 1. The coalescer includes fibrous media 28 capturing droplets of the dispersed phase, coalescingly growing the droplets into larger drops, for example as shown at 30, 32, which further coalesce and grow to form pools such as 34 which drain as shown at 36. Within the gas or air stream 24, droplets 26 can collide and grow in size by drop to drop coalescence. Upon entry into coalescer 20, the droplets are captured by impaction, interception, diffusion, or electrostatic or other filtration mechanisms. Droplets grow in size as captured and uncaptured droplets coalesce to form larger drops. When the drops become large enough and pool at 34 such that flow and/or gravitational forces exceed adhesion forces, the enlarged/pooled drops flow through the bed of fibrous media and are released as shown at 36. Dispersed phase saturation varies within the coalescer, typically with increasing saturation as one approaches the downstream face (right hand face FIG. 1), due to viscous forces, and with increasing saturation at the bottom of the coalescer due to gravity. Saturation, like porosity, is a dimensionless number representing the fraction or percent of a filter media's void space that is occupied by the captured dispersed phase. Saturation does not mean that the entire void volume is filled with the captured dispersed phase such as oil, but rather that the element is holding as much oil as it can. At saturation, more oil is held at the bottom and right than at the top and left in FIG. 1.

Figure 2:
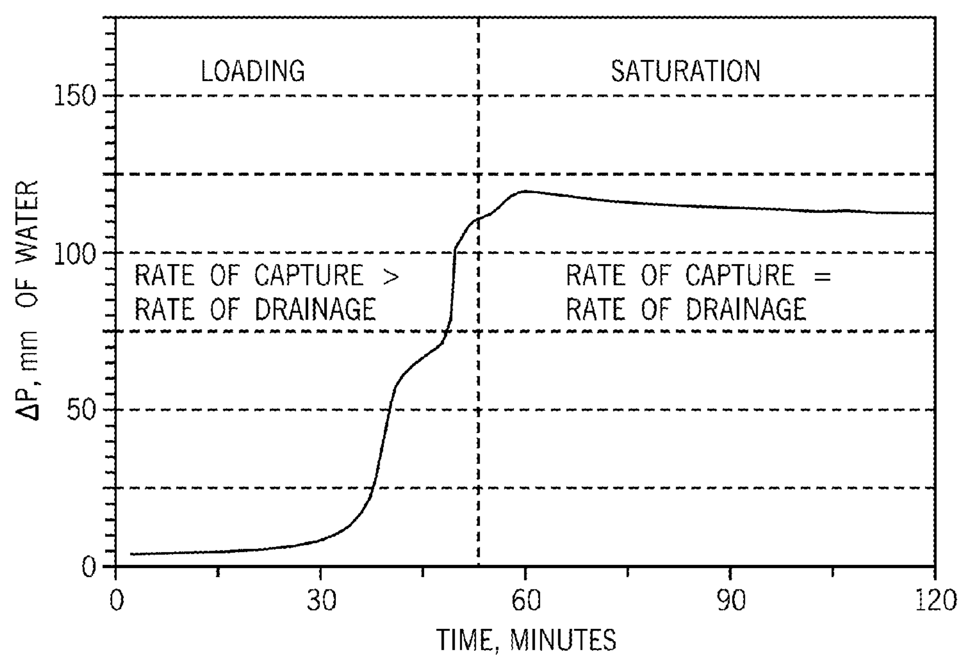
FIG. 2 is a graph showing loading and saturation.

In the absence of solid contaminants, the pressure drop across a coalescer increases during the loading of the coalescer, left side of FIG. 2, and then stabilizes once the coalescer becomes saturated, right side of FIG. 2. FIG. 2 is a graphical plot of pressure drop, ΔP, in millimeters of water, verses time in minutes. During loading, the rate of capture is greater than the rate of drainage. During saturation, the rate of capture equals the rate of drainage. In practice, plugging or excessively high pressure occurs due to solid contaminants being captured and held by the coalescer and/or the rate of capture exceeding the rate of drainage from the coalescer. In two of the desirable aspects of the present disclosure, the solids holding capacity of the coalescer is increased and the rate of drainage of the coalescer is increased. The noted saturation profile is important in coalescer design because increased saturation corresponds to decreasing effective porosity within the fibrous media bed and increasing restriction.

The present disclosure provides a coalescer with fibrous media adapted to reduce pressure drop thereacross by increasing drainage therefrom. This is accomplished in various ways, to be described.

FIG. 3 shows a fibrous media coalescer 40 having a hollow interior 42 and providing inside-out flow, namely incoming flow as shown at 44 into hollow interior 42, and then flow from hollow interior 42 outwardly through fibrous media 46 as shown at arrows 48. Coalescer 40 has a first cross-sectional area $A_1$ along a first horizontal plane 50, and a second cross-sectional area $A_2$ along a second horizontal plane 52. Horizontal plane 52, FIGS. 3, 4, is vertically below horizontal plane 50. Cross-sectional area $A_2$ is less than cross-sectional area $A_1$. Coalescer 40 has a perimeter 54 having a plurality of chords thereacross, including vertical chords such as 56 and horizontal chords such as 58. The longest of the chords, e.g. 56, extends vertically. The horizontal chords include a first horizontal chord, e.g. 58, along horizontal plane 50, and a second horizontal chord 60 along horizontal plane 52. Horizontal chord 60 is shorter than horizontal chord 58. The drainage pressure on the dispersed phase coalesced drops at the bottom of the coalescer, and hence the drainage rate at such point, is a function of the height of the dispersed phase column, which is proportional to the element height and cross-sectional area. By providing the long dimension of the shape along a vertical orientation, drainage pressure is maximized. By having the cross-sectional area decrease towards the bottom of the coalescer, two benefits are obtained. Firstly, the volume of the element that is dispersed phase saturated is minimized, where restriction is greatest and contaminated fluid flow rate and removal are least. Conversely, the volume of the element is maximized where restriction is least and contaminated fluid flow rate and removal greatest. Secondly, a greater proportion of element volume is available to capture and hold any solids that may plug the coalescer or otherwise cause excessive pressure drop. The lower section is more restrictive and has a lower flow rate than the upper section, due to increased local saturation relative to the upper section. One would expect removal to also be higher in the lower section, however this is not the case because: (a) since less flow goes through the lower section, its contribution to total removal by the element is less; and (b) the local velocity in the lower section is relatively high, which in conjunction with the increased saturation, increases re-entrainment of drops, which adversely affects removal.

FIGS. 3, 4, show the noted given shape in the vertical plane as a hollow racetrack shape. Other given shapes in the vertical plane are possible, for example a hollow oval shape 62, FIG. 5, a hollow triangle shape 64, FIG. 6, a hollow square shape 66, FIG. 7, a hollow trapezoid shape 68, FIG. 8, and a hollow circle shape 70, FIG. 9. Inside-out flow is preferred because flow velocity decreases with distance into the media, which minimizes possible re-entrainment and carryover of coalesced drops into the clean side and reduces the velocity in the portion of the coalescer where saturation is high. This is a particular advantage for racetrack and oval shapes because of their better space utilization due to the smaller upstream open hollow space in the interior of elements of these shapes. Outside-in flow is also possible.

In one embodiment, the fibrous media is provided by a plurality of fibers having a nonrandom dominantly vertical orientation, FIG. 4. The fibers are preferably polymeric and preferentially oriented around the periphery of the given shape and where possible parallel to the direction of gravity. The fibers preferably extend dominantly circumferentially tangentially along perimeter 54. The fibers preferentially extending dominantly circumferentially tangentially along perimeter 54 are dominantly vertical and provide increasing drainage pressure at lower regions of the coalescer. The elements are preferably made by electro-spinning or melt-blowing the fibers or wrapping or winding sheets of fibrous media around the element periphery giving the fibers the noted preferred orientation. The preferred orientation and alignment of the fibers reduces the resistance of captured drops to flow and enhances drainage by forming flow paths and channels parallel to gravity. For ease of manufacturability, polymeric fibers formed by melt-blowing or electro-spinning are preferred, but other materials may also be used.

In a further embodiment, FIG. 4, vibration or oscillation of the coalescer in a vertical direction, particularly in combination with the above noted fiber orientation, is a further way to enhance drainage, minimize restriction, and increase coalescer life. A shaker 72 as shown in dashed line, which in one embodiment may be an internal combustion engine or other mechanical component, vibrates or oscillates the coalescer in a vertical direction. This movement or vibration in the vertical direction accelerates the captured drops, and the sudden reversal in direction causes them to shear from the fibers and drain with minimum resistance. In the noted implementation, the normal vibration of an engine or other equipment facilitates such vibration, however it may be desirable to provide judicious positioning and mounting of the coalescer or by the addition of a mechanical vibrator for vibrating the coalescer.

Figure 10:
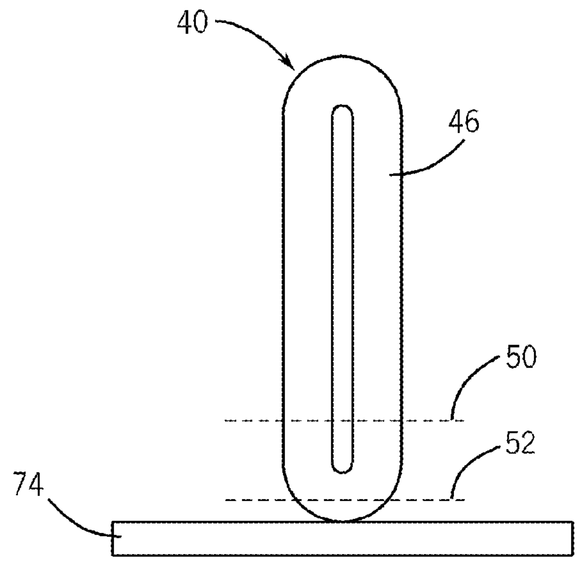
FIG. 10 is like FIG. 4 and shows a further embodiment.

The coalescer has a lower region, e.g. at plane 52, FIG. 4, of greater dispersed phase saturation and smaller volume than an upper region, e.g. at plane 50, to minimize the volume of fibrous media that is saturated with the dispersed phase where restriction is greatest and continuous phase flow rate least and contaminant removal least, and to maximize the volume of the fibrous media where restriction is least and continuous phase flow rate greatest and contaminant removal greatest. In a further embodiment, FIG. 10, a lower media element 74 is provided of greater dispersed phase wettability than fibrous media 46 and in contact with the lower region of coalescer 40 and wicking coalesced drops from fibrous media 46 at the lower region. In one embodiment, fibrous media 46 is non-wetting with respect to the dispersed phase, and lower media element 74 is wetting with respect to the dispersed phase. In preferred form, the cosine of the dispersed phase contact angle of lower media element 74 is greater than the cosine of the dispersed phase contact angle of fibrous media 46. In the above noted internal combustion engine application, the purpose of wicking layer 74 is to draw oil from the coalescer and direct it to a collection vessel, such as the engine or a sump. In the preferred form of such embodiment, wicking layer 74 is a non-woven filter media, though alternatively it could be the walls of the sump itself or other material with suitable wettability characteristics.

The above disclosure provides various means for reducing pressure drop across the coalescer, including enhancing drainage of the coalesced dispersed phase from the coalescer. As shown in FIG. 2, the pressure drop across the coalescer increases with time until the rate of drainage of the coalesced dispersed phase (e.g. oil in the case of crankcase ventilation filters) equals the rate of dispersed phase capture. The equilibrium pressure drop can be reduced by increasing the drainage rate, which in turn reduces the dispersed phase saturation of the coalescer and increases the coalescer's effective porosity. By increasing the porosity, the solids loading capacity of the coalescer is increased, as is coalescer life.

Figure 11:
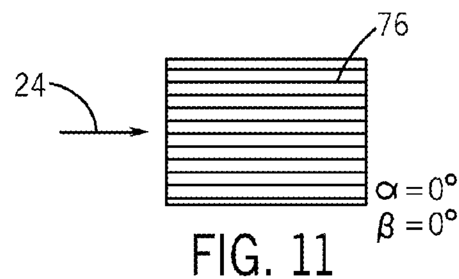
FIG. 11 is a schematic illustration showing fiber orientation angle.
Figure 12:
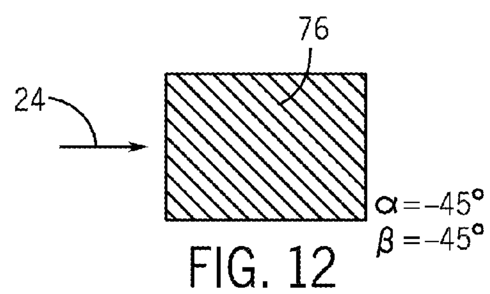
FIG. 12 is like FIG. 11 and shows another embodiment.
Figure 13:
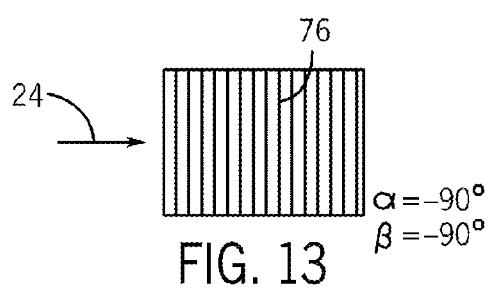
FIG. 13 is like FIG. 11 and shows another embodiment.
Figure 14:
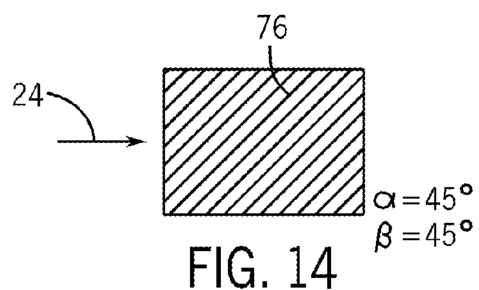
FIG. 14 is like FIG. 11 and shows another embodiment.
Figure 15:
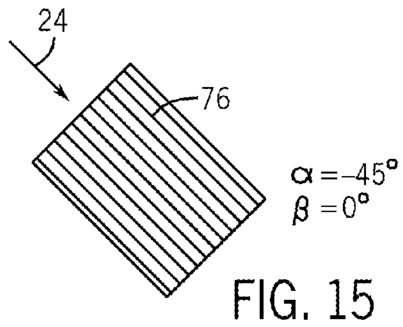
FIG. 15 is like FIG. 11 and shows another embodiment.
Figure 16:
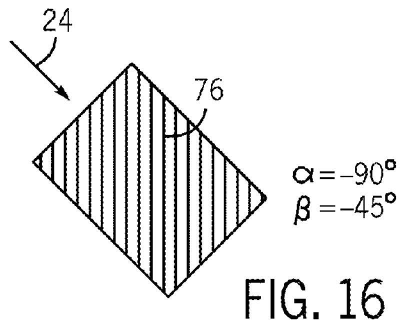
FIG. 16 is like FIG. 11 and shows another embodiment.
Figure 17:
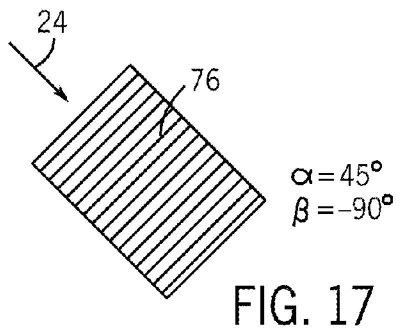
FIG. 17 is like FIG. 11 and shows another embodiment.
Figure 18:
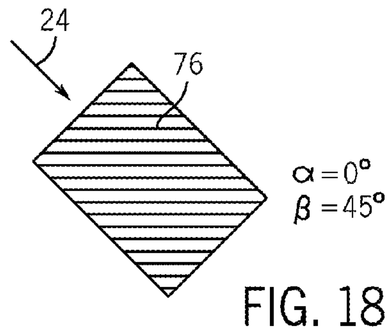
FIG. 18 is like FIG. 11 and shows another embodiment.
Figure 19:
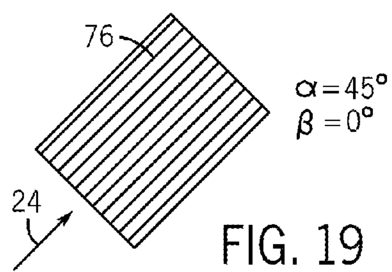
FIG. 19 is like FIG. 11 and shows another embodiment.
Figure 20:
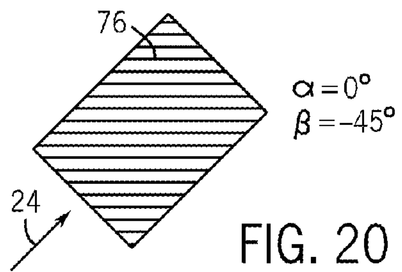
FIG. 20 is like FIG. 11 and shows another embodiment.
Figure 21:
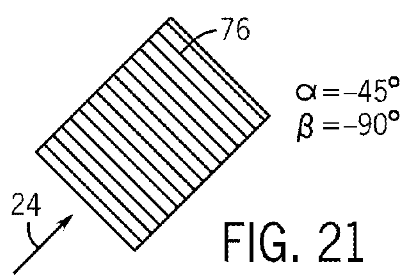
FIG. 21 is like FIG. 11 and shows another embodiment.
Figure 22:
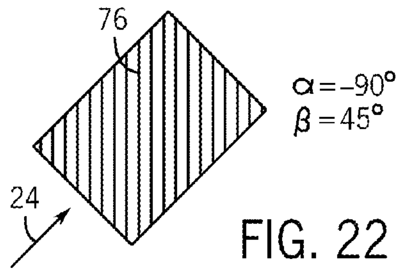
FIG. 22 is like FIG. 11 and shows another embodiment.

Further to the above disclosed manner for increasing drainage rate, various ways are available for taking further advantage of fiber orientation. Fibers may be beneficially oriented with respect to gravity and with respect to one another, as above noted. For purposes herein, a first dominant fiber orientation angle $\alpha$ is defined as the angle of fiber extension 76, FIGS. 11-22, relative to horizontal, i.e. relative to a direction which is perpendicular to gravity. In FIGS. 11, 18, 20, $\alpha$ is 0°. In FIGS. 12, 15, 21, $\alpha$ is minus 45°. In FIGS. 13, 16, 22, $\alpha$ is minus 90°. In FIGS. 14, 17, 19, $\alpha$ is 45°. Fibers may also be beneficially oriented with respect to the direction of flow. For purposes herein, a second dominant fiber orientation angle $\beta$ is defined as the angle of fiber extension 76 relative to flow direction 24. In FIGS. 11, 15, 19, $\beta$ is 0°. In FIGS. 12, 16, 20, $\beta$ is minus 45°. In FIGS. 13, 17, 21, $\beta$ is minus 90°. In FIGS.

14, 18, 22, β is 45°. FIGS. 11-22 show various exemplary flow directions among the plurality of flow directions from hollow interior 42 outwardly through fibrous media 46. FIGS. 11-14 show a flow direction 24 parallel to horizontal. FIGS. 15-18 show a flow direction 24 at minus 45° relative to horizontal. FIGS. 19-22 show a flow direction 24 at 45° relative to horizontal.

Three forces act on captured and coalesced drops, namely: drag forces due to fluid flow; gravity; and adhesion or attachment forces due to capillary pressure. The third force is controlled by the wetting characteristics of the media and is noted above. Also of significance is the interplay between drag and gravity forces. Since it is desired to drain drops downwardly, it is desired that fiber orientation angle α satisfy the condition that sine α is less than zero, so that gravity assists drainage, for example FIGS. 12, 13. If sine α is greater than zero, gravity hinders drainage, increasing the equilibrium pressure drop, and reducing life. Accordingly, the fiber orientation angles α in FIGS. 11 and 14 are less desirable. It is preferred that α be less than 0° and greater than or equal to minus 90°. As to fiber orientation angle β relative to flow direction 24, drag forces due to fluid flow decrease as cosine β increases. It is preferred that cosine β be greater than 0.5, i.e. that β be less than 60° and greater than minus 60°.

Figure 23:
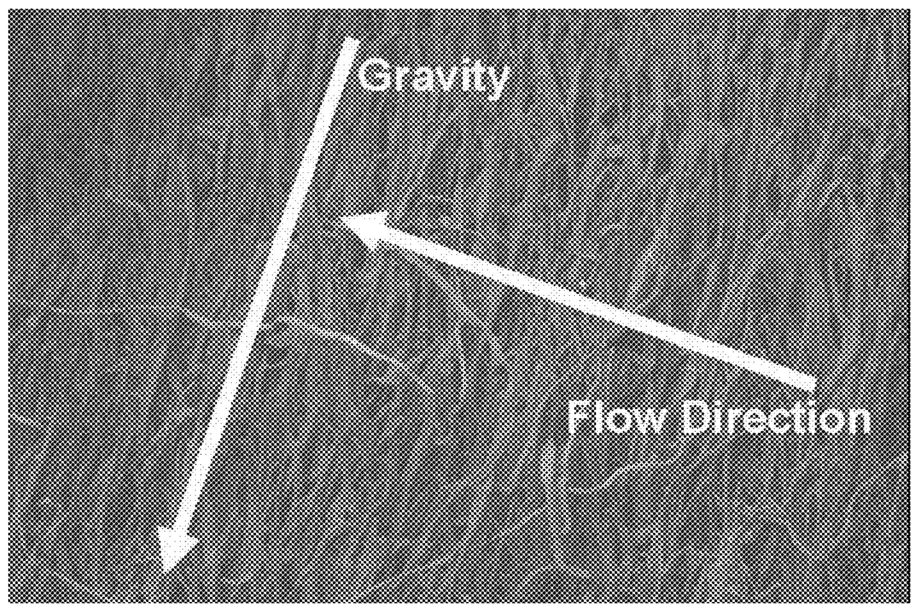
FIG. 23 is a microphotograph of fibrous media taken with a scanning electron microscope at 43× magnification.
Figure 24:
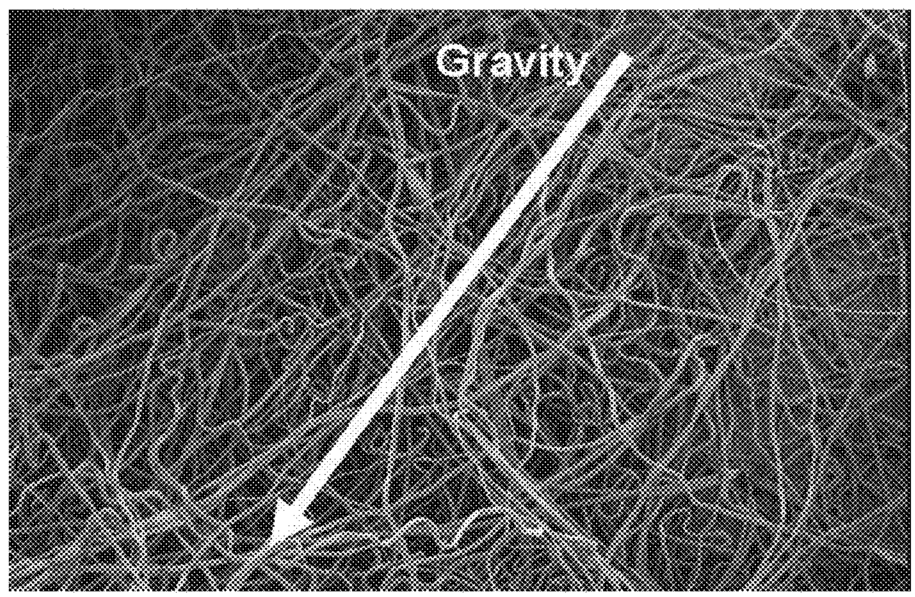
FIG. 24 is a microphotograph of fibrous media taken with a scanning electron microscope at 35× magnification, at a 90° orientation relative to FIG. 23.
Figure 25:
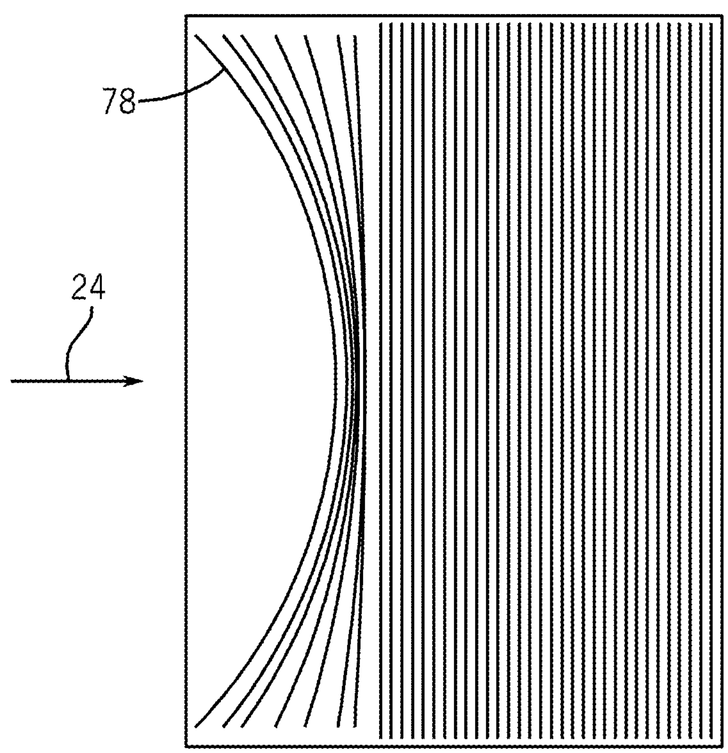
FIG. 25 is a schematic illustration of a further embodiment showing fiber orientation across a localized pocket.

In order to decrease overall saturation of the coalescer, reduce pressure drop, and increase life, it is not necessary for all fibers to exhibit the preferred orientation. Rather, most of the fibers should have the desired orientation, i.e. have a dominant fiber orientation or angle. FIG. 23 is a microphotograph showing dominant fiber orientation generally parallel to gravity and perpendicular to flow direction, as shown by the indicated arrows. FIG. 24 is a microphotograph showing fiber orientation relative to gravity, wherein the direction of flow is into the page. In further embodiments, sufficient numbers of fibers may be provided having the desired orientation to enhance drainage locally. Because the coalesced dispersed phase drains more freely from such areas, the low local dispersed phase saturation and pressure drop are maintained, and the net effective saturation of the coalescer is reduced. While it is desirable for all fibers to exhibit α less than 0° and greater than or equal to minus 90° and β less than 60° and greater than minus 60°, this may not be feasible. Various combinations may also be employed. For example, in FIG. 25 if localized regions of different fiber orientation are desired other than perpendicular, localized pockets such as shown at 78 may be formed in the fibrous media, such pockets deflecting a plurality of fibers along other fiber orientation angles α and β. These localized pockets may be provided as shown in U.S. Pat. No. 6,387,144, incorporated herein by reference, for example by needle punching to create such localized pockets, depressions, or indentations with fiber orientation angles α and β different than 0° and other than 90° or minus 90°. Other means may also be used for forming the localized pockets, for example the media may be spiked with larger fibers, wires, nails, brads, or similar structures having a high length to width aspect ratio oriented such that α and/or β is other than 90° or minus 90° as desired. In another alternative, a thread-like material may be sewed into the coalescer media using a sewing machine or the like, with the threads being oriented along an angle of 0° (parallel to flow direction), and the puncturing needle and thread would cause the surrounding media fibers to orient at angles other than 90° or minus 90°. In another alternative, rather than needle punching, the localized pockets could be created using a heated needle or an ultrasonic welding type process. This will create a saturation gradient causing the coalesced dispersed phase to drain from the coalescer. Hence, even though all fibers do not have a desired orientation angle α other than 0°, drainage will nonetheless be enhanced compared to having all fibers oriented with α equal to 0°. These refinements introduce fibers or structures preferentially oriented with respect to flow in a manner that assists drainage and reduces pressure drop. Since it is often impractical to have all fibers so oriented, localized pockets having the preferred orientation can be created in layered media to reduce pressure drop and improve coalescer life.

The present system provides a method of increasing the life of a coalescer. The coalescer has a pressure drop thereacross increasing with time until the rate of drainage of the coalesced dispersed phase equals the rate of capture, providing an equilibrium pressure drop. The method increases coalescer life by reducing dispersed phase saturation and increasing porosity and solids loading capacity by decreasing equilibrium pressure drop by increasing the rate of drainage. The method involves providing fibrous media as a plurality of fibers and dominantly orienting the fibers preferably along a first dominant fiber orientation angle α less than 0° and greater than or equal to minus 90° and preferably along a second dominant fiber orientation angle β less than 60° and greater than minus 60°. In one embodiment, the coalescer is vertically vibrated. The method involves minimizing the volume of fibrous media that is saturated with the dispersed phase where restriction is greatest and flow rate and removal least, and maximizing the volume of the fibrous media where restriction is least and flow rate and removal greatest, by providing the coalescer with a lower region of greater dispersed phase saturation and smaller volume than an upper region. In one embodiment, the coalesced drops are wicked away from the fibrous media at the lower region of increased dispersed phase saturation.

It is recognized that various equivalents, alternatives and modifications are possible within the scope of the appended claims.

What is claimed is:

1. A method for coalescing liquid dispersed in a continuous phase comprising gas, the method comprising passing said continuous phase through a crankcase ventilation system comprising a coalescer, wherein the continuous phase flows from upstream to downstream through said coalescer in a horizontally oriented direction relative to gravity, said coalescer comprising fibrous media capturing droplets of said liquid dispersed in said gas, coalescingly growing said droplets into larger drops which further coalesce and grow to form pools that drain, said fibrous media being adapted to reduce pressure drop thereacross by increasing drainage of the liquid therefrom;

wherein said coalescer comprises a vertically oriented front face relative to gravity, side walls of said fibrous media, and a hollow interior, said front face having an opening, wherein said continuous phase flows axially through said opening of said front face, into said hollow interior, and exits horizontally through said walls of said fibrous media in said system;

wherein said coalescer has a first cross-sectional area along a first horizontal plane perpendicular to said front face, and a second cross-sectional area along a second horizontal plane perpendicular to said front face, said second horizontal plane being vertically below said first horizontal plane, said second cross-sectional area being less than said first cross-sectional area;

wherein said coalescer has a perimeter defining a given shape in a vertical plane parallel to said front face, said perimeter having a plurality of chords thereacross, including vertical chords and horizontal chords and the longest of said chords extends vertically;

wherein said given shape in said vertical plane is selected from the group consisting of a racetrack shape, an oval shape, a triangle shape, and a trapezoid shape.

2. The method according to claim 1 wherein said perimeter defines a given shape in a vertical plane, said perimeter having a plurality of chords thereacross, the longest of said chords extending vertically, and providing increasing drainage pressure at lower vertical regions of said coalescer.

3. The method according to claim 2 wherein said coalescer has a first cross-sectional area along a first horizontal plane perpendicular to said front face, and a second cross-sectional area along a second horizontal plane perpendicular to said front face, said second horizontal plane being vertically below said first horizontal plane, said second cross-sectional area being less than said first cross-sectional area, said plurality of chords include vertical chords and horizontal chords, said horizontal chords including a first horizontal chord along said first horizontal plane, and a second horizontal chord along said second horizontal plane, said second horizontal chord being shorter than said first horizontal chord.

4. The method according to claim 1 wherein said coalescer has a lower region of greater dispersed phase saturation and smaller volume than an upper region, to minimize the volume of said fibrous media where restriction is greatest and continuous phase flow rate least, and to maximize the volume of said fibrous media where restriction is least and continuous phase flow rate greatest.

5. The method according to claim 1 wherein said coalescer has a lower region of increased dispersed phase saturation, and comprising a lower media element of greater dispersed phase wettability than said fibrous media and in contact with said lower region of said coalescer and wicking said coalesced drops from said fibrous media at said lower region.

6. The method according to claim 5 wherein said fibrous media is nonwetting with respect to said dispersed phase, and said lower media element is wetting with respect to said dispersed phase.

7. The method according to claim 1 wherein said coalescer has a lower region, and comprising a lower media element in contact with said lower region of said coalescer, and wherein the cosine of the dispersed phase contact angle of said lower media element is greater than the cosine of the dispersed phase contact angle of said fibrous media.

8. The method according to claim 1 wherein said fibrous media comprises a plurality of fibers having a dominant fiber orientation generally parallel to gravity and perpendicular to flow direction.

9. The method according to claim 1 further comprising a shaker vertically vibrating said coalescer.

10. The method according to claim 1 wherein the liquid comprises oil.

* * * * *